US006991726B2

(12) United States Patent
St. Germain

(10) Patent No.: US 6,991,726 B2
(45) Date of Patent: Jan. 31, 2006

(54) FILTER HAVING A MEDIA RETAINING PLATE

(75) Inventor: Darin St. Germain, Gilbert, IA (US)

(73) Assignee: USFilter Corporation, Warrendale, PA (US)

( * ) Notice: Subject to any disclaimer, the term of this patent is extended or adjusted under 35 U.S.C. 154(b) by 209 days.

(21) Appl. No.: 10/186,493

(22) Filed: Jul. 1, 2002

(65) Prior Publication Data

US 2004/0000512 A1    Jan. 1, 2004

(51) Int. Cl.
B01D 23/24    (2006.01)
(52) U.S. Cl. .................. 210/274; 210/279; 210/293; 210/275; 210/292; 210/793
(58) Field of Classification Search ........... 210/274, 210/275, 293, 541, 793, 794, 795, 292, 279
See application file for complete search history.

(56) References Cited

U.S. PATENT DOCUMENTS

| | | | |
|---|---|---|---|
| 1,770,830 A * | 7/1930 | Barbour ............... | 210/293 |
| 1,773,417 A * | 8/1930 | Whitacre ............. | 210/293 |
| 2,710,692 A | 6/1955 | Kegel et al. | |
| 2,716,490 A | 8/1955 | Barstow | |
| 2,874,844 A * | 2/1959 | Wanner ............... | 210/150 |
| 3,512,649 A * | 5/1970 | Nebolsine et al. ...... | 210/274 |
| 3,840,117 A * | 10/1974 | Ross .................. | 210/794 |
| 4,065,391 A | 12/1977 | Farabaugh | |
| 4,133,766 A | 1/1979 | Adie | |
| 4,214,992 A | 7/1980 | Sasano et al. | |
| 4,222,876 A | 9/1980 | Englehart | |
| 4,331,542 A | 5/1982 | Emrie | |
| 4,364,830 A | 12/1982 | Roberts | |
| 4,564,450 A | 1/1986 | Piper et al. | |
| 4,619,765 A | 10/1986 | Roberts | |
| 4,750,999 A | 6/1988 | Roberts et al. | |
| 4,882,053 A | 11/1989 | Ferri | |
| 5,019,259 A | 5/1991 | Hambley | |
| 5,068,034 A | 11/1991 | Walter | |
| 5,087,358 A * | 2/1992 | Massignani ........... | 210/195.1 |
| 5,087,362 A | 2/1992 | Brown | |
| 5,089,147 A | 2/1992 | Ross | |
| 5,108,627 A | 4/1992 | Berkebile et al. | |
| 5,149,427 A | 9/1992 | Brown et al. | |
| 5,160,614 A | 11/1992 | Brown | |
| 5,202,022 A | 4/1993 | Ferri | |

(Continued)

FOREIGN PATENT DOCUMENTS

WO    WO 97/40907    11/1997

(Continued)

OTHER PUBLICATIONS

EIMCO Granular Media Filter Systems, Brochure, published prior to Jul. 1, 2001.

(Continued)

*Primary Examiner*—Minh-Chau T. Pham

(57) ABSTRACT

The invention recites a filtration system including a block including a first wall and a second wall substantially parallel to the first wall. A top surface that is substantially perpendicular to the first wall is disposed between, and coupled to, the first and second walls to at least partially define an inner chamber. The top surface further includes an orifice defining a passageway between a block exterior and the inner chamber. A plate including a plurality of slots, each slot having a width of less than about 0.065 inches, and a slot outlet, is coupled to the top surface of the block. The slot outlets in the plate are substantially coplanar and the plate, when coupled to the block, substantially covers the orifice.

20 Claims, 4 Drawing Sheets

U.S. PATENT DOCUMENTS

| | | |
|---|---|---|
| 5,232,592 A | 8/1993 | Brown et al. |
| 5,269,920 A | 12/1993 | Brown et al. |
| 5,328,608 A | 7/1994 | Bergmann et al. |
| 5,332,497 A | 7/1994 | Shea et al. |
| 5,413,710 A | 5/1995 | Roberts et al. |
| 5,489,388 A | 2/1996 | Brown et al. |
| 5,534,202 A | 7/1996 | Roberts et al. |
| 5,618,421 A | 4/1997 | Sorosinski |
| 5,639,384 A | 6/1997 | Brown et al. |
| 5,865,999 A | 2/1999 | Shea et al. |
| 6,797,166 B1 * | 9/2004 | Hambley et al. ........... 210/274 |
| 2004/0000512 A1 * | 1/2004 | Germain ..................... 210/293 |

FOREIGN PATENT DOCUMENTS

WO      WO 98/04332      2/1998

OTHER PUBLICATIONS

AWI, Brochure, "The Phoenix Panel System* . . . ", published prior to Jul. 1, 2001.

* cited by examiner

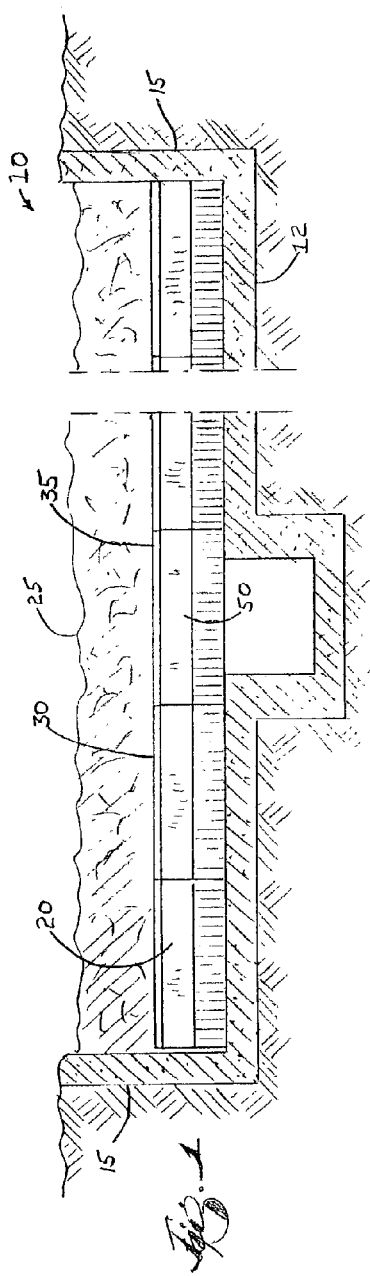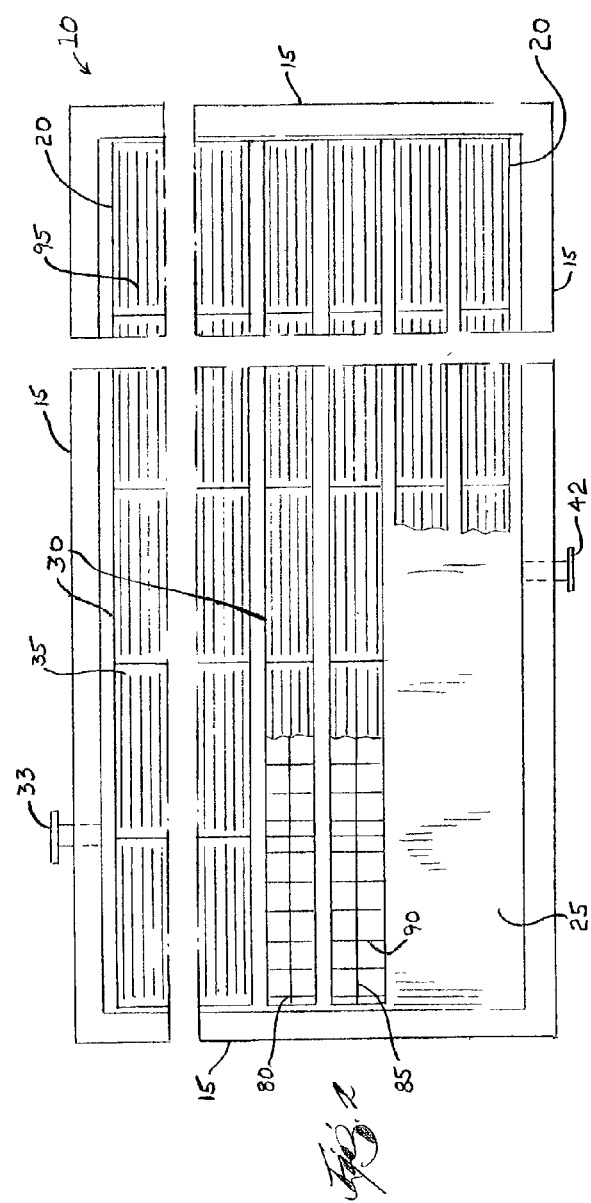

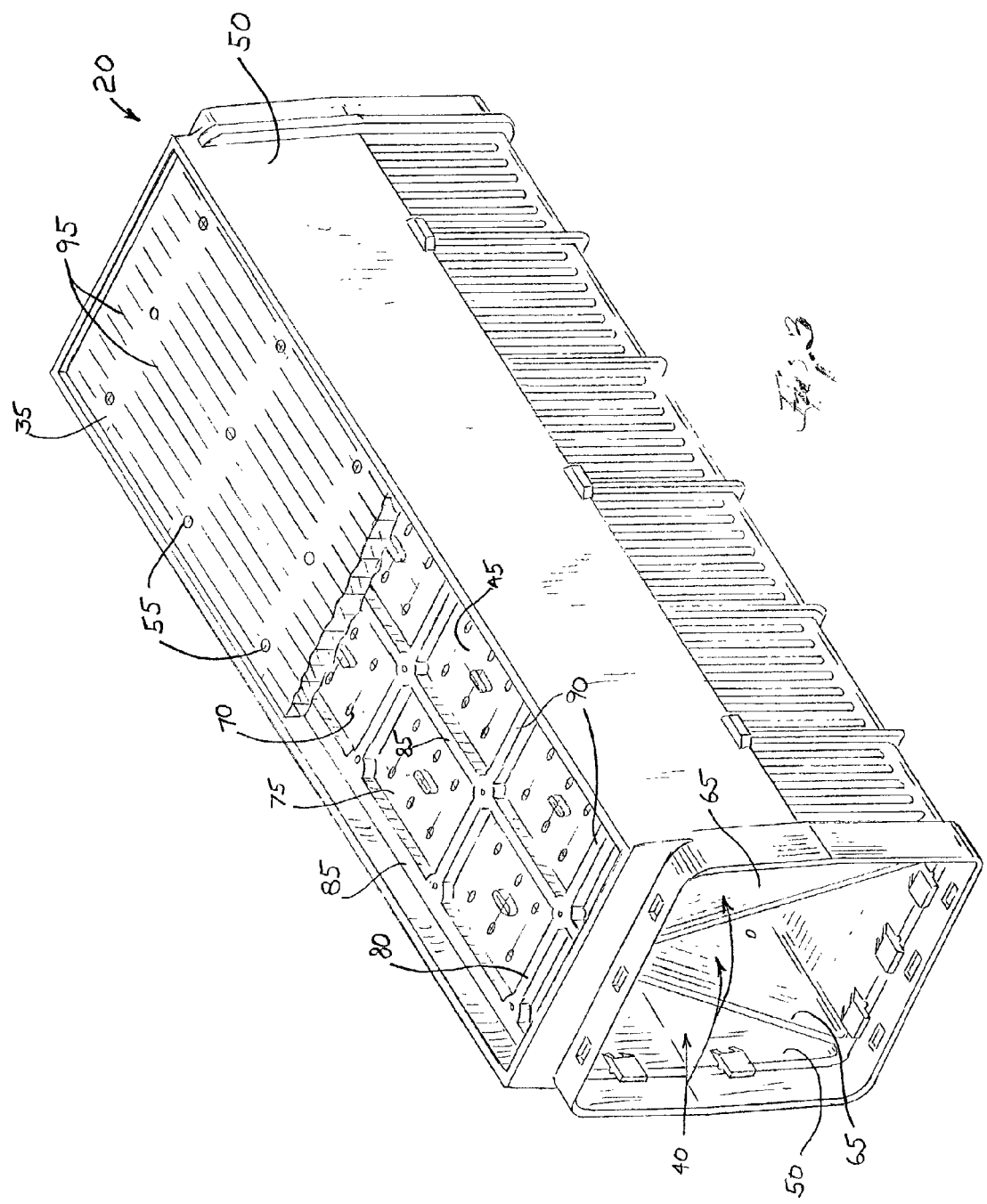

FILTER HAVING A MEDIA RETAINING PLATE

BACKGROUND AND SUMMARY OF THE INVENTION

The present invention relates to filters, and particularly to underdrains in gravity filters. More particularly, the present invention relates to underdrains in gravity filters having a cap or plate supporting a filter media.

Gravity filters frequently employ underdrain blocks to channel fluid away from the filter bed and to direct backwash fluids evenly into the filter bed during a backwash cycle. Underdrain blocks are assembled end to end forming rows, also known as laterals. Several laterals are placed next to one another to define the filter bottom. A filter media (e.g., granular activated carbon, anthracite, coal, magnesium oxide, ilmenite, sand including garnet, silica or quartz, etc.) placed on top of the laterals completes the filter bed and performs a majority of the filtration.

In operation, the filter bed receives a flow of fluid to be filtered and passes it through the filter media to the underdrain blocks. The size and arrangement of the filter media allows it to filter out the undesired contaminates, with finer filter media being able to filter out smaller contaminates. The flow, or filtrate, enters the underdrain blocks through openings generally provided in the tops of the underdrain blocks. The underdrain block laterals provide a convenient channel or flow path, allowing removal of the filtrate from the filter bed.

Periodically, a backwash cycle is initiated to clean the filter media. During a backwash cycle, fluid flow reverses, thus flowing into the underdrain blocks and upwardly through the filter media to loosen and remove contaminates.

It is desirable to have large openings in the filter blocks to allow free filtrate flow into the blocks. However, large openings are incapable of supporting the filter media and instead allow the media to pass into the underdrain blocks, which is undesirable. Small openings on the other hand, are capable of supporting the filter media, but are easily plugged by the filter media disposed above and upstream of the underdrain blocks. Also, small openings provide greater restriction to flow than large openings even when unclogged. Therefore, it is desirable to provide an underdrain block capable of supporting the filter media above, while simultaneously reducing the likelihood of media entering the underdrain block, and minimizing plugging of the openings. It is also desirable to provide an underdrain block having a high percentage of open surface area, thereby allowing a free fluid flow therethrough.

Thus, according to the present invention, a filtration system provides a block including a first wall and a second wall substantially parallel to the first wall. A top surface that is substantially perpendicular to the first wall is disposed between, and coupled to, the first and second walls to at least partially define an inner chamber. The top surface further includes an orifice defining a passageway between a block exterior and the inner chamber. A plate including a plurality of slots, each slot having a width of less than about 0.065 inches, and a slot outlet, is coupled to the top surface of the block. The slot outlets in the plate are substantially coplanar and the plate, when coupled to the block, substantially covers the orifice.

The invention further provides a method of manufacturing the filtration system. The filtration system includes an underdrain block, a retaining plate, and a filter media. The underdrain block includes an outer wall having a first side and a second side substantially parallel to the first side. The outer wall also includes a top surface substantially perpendicular to the first and second sides. A plurality of orifices are defined within the top surface. The retaining plate has an upper surface and a lower surface. The method includes the steps of forming the retaining plate such that the upper surface and the lower surface are substantially parallel to one another. The method further includes laser etching the plurality of slots into the retaining plate such that the area of the slots is at least equal to the area of the orifices, and such that the slot outlets are coplanar. The method further comprises aligning the retaining plate with the underdrain block, and coupling the retaining plate to the underdrain block such that the retaining plate at least partially covers the plurality of orifices of the underdrain block.

In preferred embodiments, the retaining plate is manufactured from a stainless steel plate that is less than one-eight of an inch thick. The plurality of slots are preferably laser-etched through the plate and have a width between 0.002 inches and 0.025 inches. A series of longitudinal and cross members defined by the block provide support to the plate when attached to the block. In preferred embodiments, a plurality of screws attach the retaining plate to the block.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a section view of a gravity filter in accordance with the present invention including underdrain blocks having media retaining plates;

FIG. 2 is a top view of the gravity filter of FIG. 1 with the filter media removed;

FIG. 3 is a perspective view of an underdrain block of FIG. 1 including the media retaining plate;

DETAILED DESCRIPTION OF THE DRAWINGS

Figure 4:
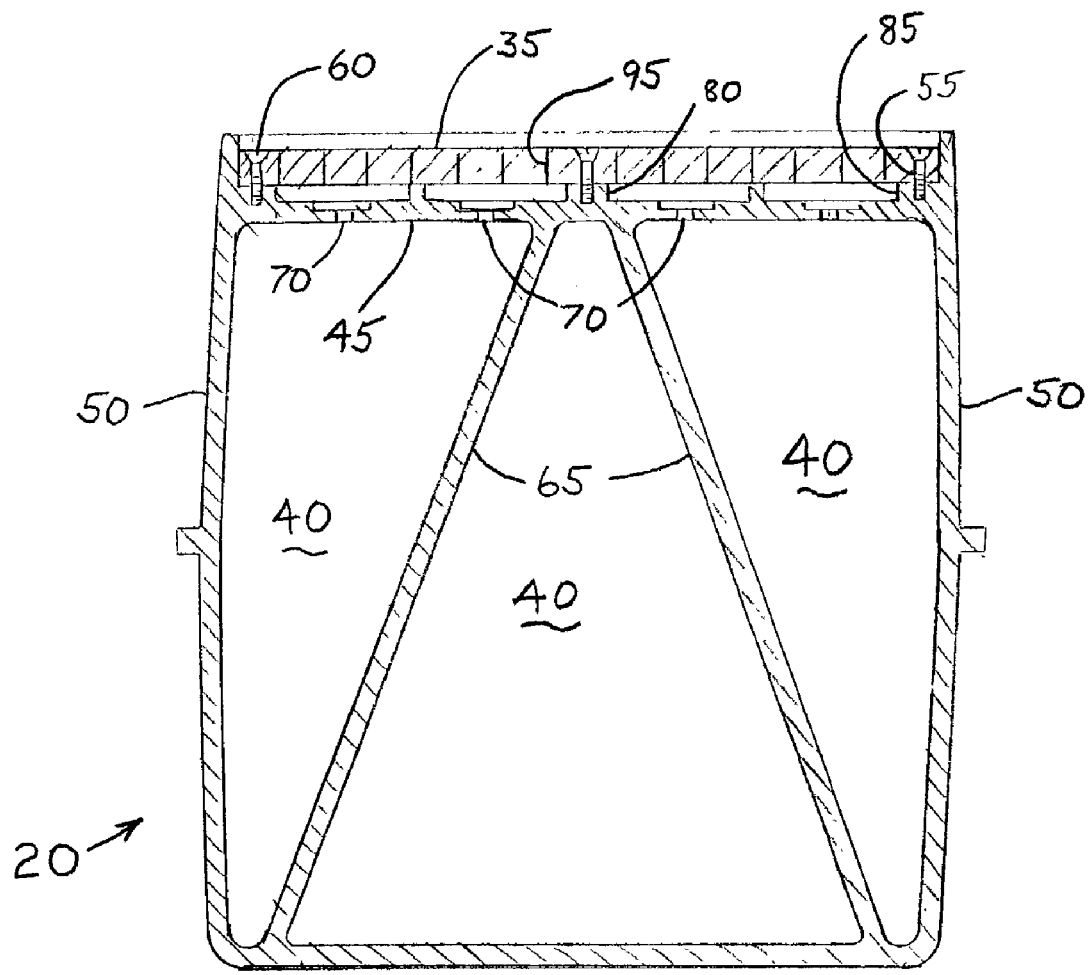
FIG. 4 is a section view of the underdrain block of FIG. 3.

As shown in FIGS. 1 and 2, a gravity filter bed 10 includes a base 12, walls 15, a plurality of underdrain blocks 20 disposed on the base 12, and a filter media 25 disposed on top of the underdrain blocks 20. The base 12 and walls 15 define the outer boundaries of the filter bed 10 and are generally impermeable to the fluid being filtered. Underdrain blocks 20 are assembled end to end to define underdrain laterals 30, the underdrain laterals 30 are then placed side by side to substantially cover the base 12. The filter media 25, generally granular activated carbon, anthracite, coal, magnesium oxide, ilmenite, or sand including garnet, silica or quartz, of varying size is placed on top of the underdrain laterals 30 to complete the gravity filter bed 10.

Referring to FIGS. 1 and 2, in operation a flow of fluid to be filtered enters the filter at an inlet 33 near the top of the filter bed 10. The fluid passes through the filter media 25 following a tortuous path that requires the fluid to pass through narrow openings defined by the filter media particles. Smaller particles defining smaller openings result in a more effective filter capable of removing smaller particles. After passing through the filter media 25, the filtrate passes through a media retaining plate 35 and enters the underdrain blocks 20. The underdrain blocks 20 may include manifolds 40 (shown in FIG. 3) to further channel and guide the fluid to a desired extraction point 42. Filtrate then exits, or is extracted from, the filter bed 10, thereby resulting in a continuous flow of filtrate.

FIG. 3 illustrates an underdrain block 20 of the invention. The underdrain block 20 includes a top surface 45, a pair of opposed walls 50 separated by the top surface 45, and a media retaining plate 35 (shown partially broken away) supported by the underdrain block 20. The media retaining plate 35 includes holes 55 that allow for the connection of the media retaining plate 35 to the underdrain block 20. During normal operation, the weight of the filter media 25 (FIG. 1) along with the pressure created by the fluid flow maintains the media retaining plate 35 in position on top of the underdrain block 20. However, during a backwash cycle, the flow of fluid in the opposite direction can move an unrestrained media retaining plate 35. The media retaining plate 35 therefore uses a plurality of bolts or screws 60 (FIG. 4) to attach the media retaining plate 35 to the underdrain block 20. In other embodiments (not shown), clamps attach the media retaining plate 35 to the underdrain block 20. In still other embodiments (also not shown), the media retaining plate 35 fixedly attaches to the underdrain block 20 using an adhesive, welding, soldering, brazing or the like.

Referring still to FIG. 3, the underdrain block 20 contains a pair of slanted walls 65 extending nearly the full length of the underdrain block 20. The slanted walls 65 define manifolds 40 within the underdrain block 20 for channeling fluid. The slanted walls 65 also provide additional support and stiffness to the underdrain block 20. Alternatively, additional internal walls could be employed to define additional manifolds and provide additional support. Alternatively, an embodiment with no internal walls can be used, thus defining one internal manifold comprising the entire inner chamber of the underdrain block 20.

The top surface 45 of the underdrain block 20 contains a number of orifices 70 sized to allow flow of filtrate into the interior of the underdrain block 20. The orifices 70, shown best in FIG. 4, allow for a free flow of filtrate and are not generally intended to function as a filter themselves. The orifices 70 are also positioned to allow the top surface 45 of the underdrain block 20 to define a support grid 80 to support the media retaining plate 35.

The support grid 80 is defined by the top surface 45 of the underdrain block 20 and provides support to the media retaining plate 35. The support grid 80 also provides convenient attachment points for the media retaining plate 35. The additional support that is provided by the support grid 80 allows for the use of a thinner media retaining plate 35, if desired.

As illustrated in FIG. 3, the support grid 80 includes three long members 85, parallel to the walls 50 of the underdrain block 20 and several cross members 90 interconnecting the walls 50 and the long members 85. The support grid 80 thus defines several large openings able to accommodate flow of filtrate, while providing substantial support to the media retaining plate 35. In other embodiments (not shown), different arrangements of long members 85 and cross-members 90 are employed. For example, a support grid having two long members and two cross members would result in a hollow rectangular support that provides the largest flow area, but the least structural support. The required flow area and required structural support must be balanced for the particular application to determine the exact arrangement of the long members 85 and cross members 90 of the support grid 80.

The media retaining plate 35, illustrated attached to an underdrain block 20 in FIGS. 3 and 4, is generally a flat plate having a plurality of apertures, or slots 95, cut therethrough. While many different materials are envisioned as being suitable for a media retaining plate 35 (e.g., ceramics, plastics, composites, etc.), the preferred materials are metals. The use of a metal allows for a thin media retaining plate 35 that has sufficient strength to support the filter media 25 and endure the stress of multiple backwash cycles. Of the available metals, steel and stainless steel are the most preferred. However, a person skilled in the art will realize that the material chosen is a function of many variables including the chemical make-up of the filtrate, the operating pressure of the system, and the number of backwash cycles desired.

Figure 6:
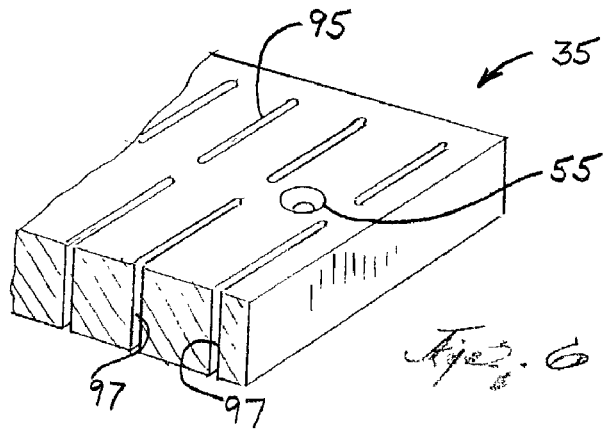
FIG. 6 is a perspective view of a portion of the media retaining plate of FIG. 3.

While the final thickness of the media retaining plate 35 is dependant on the specific application, it is preferred that the thickness be less than 0.25 inches, with the most common thickness being less than about 0.125 inches. In the most preferred embodiments, the media retaining plate thickness will be approximately one-sixteenth of an inch or less. It should be noted that FIGS. 3, 4, and 6 illustrate a media retaining plate 35 having a thickness that appears greater than what would be used in a preferred embodiment. The thickness of the media retaining plates 35 has been exaggerated to better illustrate the features of the media retaining plate 35. This should not be read to imply that media retaining plates 35 of the thickness shown would not function according to the present invention, but rather that, in preferred embodiments the media retaining plates 35 is thinner. Some applications (e.g., large quantities of filter media, low strength retaining plates 35, etc.) may require media retaining plates 35 of the thickness shown or even thicker.

Figure 5:
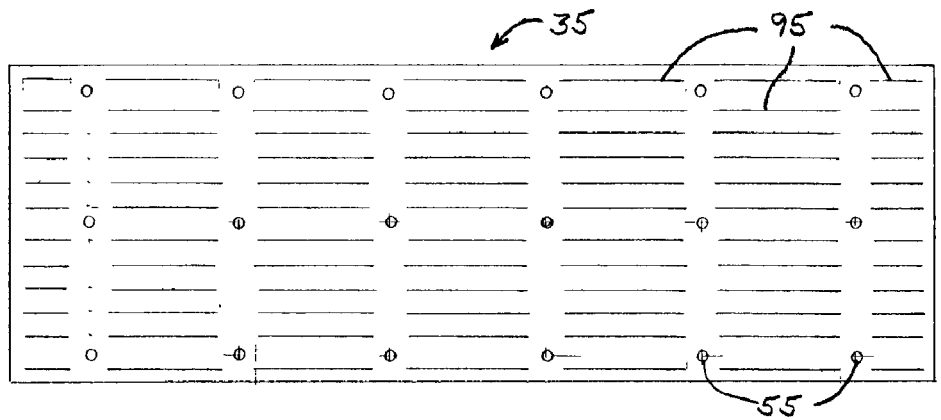
FIG. 5 is a top view of the media retaining plate of FIG. 3.

Referring to FIGS. 5 and 6 the media retaining plate 35 includes a plurality of elongated narrow slots 95 cut through the media retaining plate 35 to provide a fluid flow path. The slots 95 define a filtrate flow path that does not restrict the flow of filtrate to an extent greater than the orifices 70 in the top surface 45 of the underdrain block 20 (see FIG. 3). In addition, the slots 95 are sufficiently narrow to reduce the likelihood of filter media 25 entering the slots 95 and passing into the underdrain block 20. While the exact width of the slots 95 is dependent on, among other things, the filter media 25 disposed on top of the media retaining plate 35, a preferred embodiment uses a slot width of less than 0.025 inches. In other embodiments, the slot widths can be as small as 0.002 inches with 0.008 inches to 0.010 inches being envisioned as the most common width.

FIG. 6 shows a portion of the media retaining plate 35 with the slot widths exaggerated to show their configuration. The narrowness of the slots 95 requires that special machining techniques be used in the manufacture of the media retaining plates 35. Slots 95 as narrow as those envisioned herein would be difficult to machine accurately using more conventional processes (e.g., milling, drilling, grinding, EDM, and the like). Therefore, a laser cutting/etching process is used to cut the slots 95. The laser process allows for very accurate placement of the slots 95 relative to one another as well as accurate control over the individual slot dimensions. In other embodiments, other processes such as oxy-fuel cutting, plasma cutting, or water jet cutting may be employed to form the slots 95. In still other embodiments using large slot widths, more conventional machining processes may be adequate.

The slots 95 are shaped such that the slot walls 97 remain parallel to one another throughout the thickness of the media retaining plate 35. In addition, the slot inlet flow area is substantially equal to the outlet flow area. In other words, the slot width and slot length remain constant through the thickness of the media retaining plate 35. In another embodiment (not shown), the slot walls 97 are not parallel and in fact diverge from one another as the slot 95 progresses through the media retaining plate 35. This configuration results in a slot 95 having a constant length and an increasing width through the depth of the slot 95. The total flow area of the slots 95 is determined before laser etching the slots 95 to assure a flow area at least as great as the flow area of the orifices 70. This assures that the media retaining plate 35 is not a substantial flow restriction in the filter bed 10.

Figure 7:
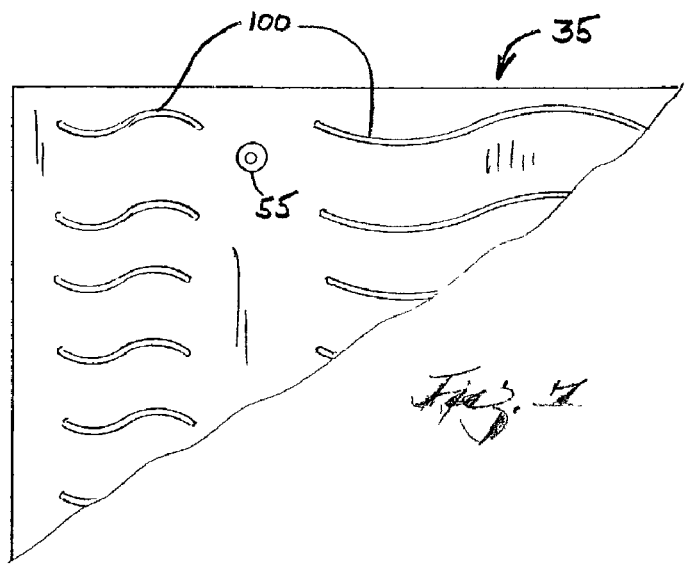
FIG. 7 is a top view of another embodiment of a media retaining plate in accordance with the present invention.

FIG. 7 illustrates another embodiment of the invention, wherein the slots 100 curve relative to the underdrain block 20 but remain parallel to one another. As one skilled in the art will recognize, there are many patterns of slots 100 that can be employed in the media retaining plate 35, some of these patterns having slots that are not parallel to one another. The only limitations are the area of the media retaining plate 35, the flow area of the slots 100, and the strength and rigidity needed in the finished media retaining plate 35.

Although the invention has been described in detail with reference to certain preferred embodiments, variations and modifications exist within the scope and spirit of the invention as described and defined in the following claims.

What is claimed is:

1. A filtration system comprising:
a block including a first wall, a second wall substantially parallel to the first wall, and a top surface substantially perpendicular to the first wall, the top surface coupled to and disposed between the first and second walls such that the walls and top surface at least partially define an inner chamber, the top surface including an orifice defining a passageway between a block exterior and the inner chamber;
a plate including a plurality of slots extending through the plate, each slot having a width of less than 0.065 inches, and a slot outlet, the slot outlets being coplanar, the plate being coupled to the top surface and substantially covering the orifice; and
a plurality of fasteners fixedly attaching the plate to the block.

2. The filtration system of claim 1, wherein the fasteners are screws.

3. The filtration system of claim 1, wherein the top surface of the underdrain block further includes;
a longitudinal member substantially parallel to the first and second walls and disposed therebetween, and
at least one cross member disposed at an angle to the longitudinal member, the cross member coupled to the first wall, the second wall, and the longitudinal member.

4. The filtration system of claim 1, wherein the orifice further comprises a plurality of orifices and each of the plurality of orifices defines an orifice flow area, the sum of those orifice flow areas defining a total orifice flow area, and wherein each of the plurality of slots defines a slot flow area, the sum of the slot flow areas defining a total slot flow area, and wherein the total slot flow area is at least as large as the total orifice flow area.

5. The filtration system of claim 1, wherein the slot width is between 0.002 inches and 0.025 inches.

6. The filtration system of claim 1, wherein each of the plurality of slots further defines a first slot area measured at the upper surface and a second slot area measured at the lower surface, and wherein the first slot area and the second slot area are substantially equal.

7. The filtration system of claim 1, wherein each of the plurality of slots defines a first slot wall and a second slot wall, the first and second slot walls being substantially parallel to one another.

8. The filtration system of claim 1, wherein the retaining plate defines a length and a width and a thickness, and wherein the thickness is less than about one-eighth of one inch.

9. The filtration system of claim 1, wherein the retaining plate is stainless steel.

10. The filtration system of claim 1, wherein at least one of the slots includes two substantially parallel walls that are spaced apart from one another to define a substantially constant width.

11. A filtration system comprising:
a fluid inlet;
a fluid outlet;
a plurality of underdrain blocks coupled to one another to define an underdrain lateral;
at least one of the plurality of underdrain blocks in fluid communication with the fluid inlet and the fluid outlet, the underdrain block having an outer wall surrounding an inner chamber, the outer wall including a first side, a second side parallel to the first side and a top surface perpendicular to the first side and formed to include an orifice defining a passageway between an exterior of the underdrain block and the inner chamber; and
a metal retaining plate including a planar upper surface, a planar lower surface, and a plurality of slots extending through the plate from the upper surface to the lower surface, each slot having a substantially constant width of less than 0.025 inches extending between the upper surface and the lower surface, the metal plate being coupled to the outer wall and substantially covering the orifice.

12. The filtration system of claim 11, further comprising a plurality of screws fixedly attaching the retaining plate to the underdrain block.

13. The filtration system of claim 11, wherein the orifice further comprises a plurality of orifices and each of the plurality of orifices defines a flow area, the sum of those flow areas defining a total orifice flow area, and wherein each of the plurality of slots defines a slot flow area, the sum of the slot flow areas defining a total slot flow area, and wherein the total slot flow area is at least as large as the total orifice flow area.

14. The filtration system of claim 11, wherein the slots define a slot width and wherein the slot width is between 0.002 inches and 0.025 inches.

15. The filtration system of claim 11, wherein each of the plurality of slots further defines a first slot area measured at the upper surface and a second slot area measured at the lower surface, and wherein the first slot area and the second slot area are substantially equal.

16. The filtration system of claim 11, wherein the metal retaining plate is manufactured from stainless steel.

17. The filtration system of claim 11, wherein the retaining plate defines a length, a width, and a thickness, and wherein the thickness is less than about one-eighth of one inch.

18. The filtration system of claim 11, wherein each of the plurality of slots defines a first slot wall and a second slot wall, the first and second slot walls being substantially parallel to one another.

19. A filtration system including a quantity of filter media, the filtration system comprising:

a block including a wall defining an inner chamber, the wall including a top portion defining an orifice that provides fluid communication with the inner chamber; and a plate including a plurality of non-tapered slots extending through the plate, each slot having a width of less than 0.065 inches, and a slot outlet, the slot outlets being coplanar, the plate being coupled to the top surface and substantially covering the orifice, the plate adapted to at least partially support the quantity of filter media and to provide fluid communication between the filter media and the orifice.

20. The filtration system of claim 19, wherein the plate substantially supports a column of filter media disposed directly above the plate.

* * * * *